United States Patent
Akagi

(10) Patent No.: US 6,931,421 B2
(45) Date of Patent: Aug. 16, 2005

(54) ORDER INFORMATION ACQUIRING METHOD AND ORDER INFORMATION CONTROLLING METHOD FOR MEDICAL IMAGING SYSTEM

(75) Inventor: Eiichi Akagi, Hino (JP)

(73) Assignee: Konica Corporation (JP)

( * ) Notice: Subject to any disclaimer, the term of this patent is extended or adjusted under 35 U.S.C. 154(b) by 500 days.

(21) Appl. No.: 10/100,888

(22) Filed: Mar. 18, 2002

(65) Prior Publication Data

US 2002/0143572 A1 Oct. 3, 2002

(30) Foreign Application Priority Data

Mar. 19, 2001 (JP) .......................................... 2001-078941
Mar. 19, 2001 (JP) .......................................... 2001-078942

(51) Int. Cl.[7] ............................................... G06F 17/30
(52) U.S. Cl. .......................................... 707/203; 707/8
(58) Field of Search .................................. 707/203, 7–8, 707/201

(56) References Cited

U.S. PATENT DOCUMENTS

| | | | | |
|---|---|---|---|---|
| 5,926,816 A | * | 7/1999 | Bauer et al. .................... | 707/8 |
| 6,219,818 B1 | * | 4/2001 | Freivald et al. ............. | 714/799 |
| 6,501,827 B1 | * | 12/2002 | Takasawa .................... | 378/116 |
| 2001/0047317 A1 | * | 11/2001 | Yodo ........................... | 705/34 |
| 2002/0102028 A1 | * | 8/2002 | Keller et al. ................. | 382/239 |

* cited by examiner

Primary Examiner—Alford W. Kindred
Assistant Examiner—CamLinh Nguyen
(74) Attorney, Agent, or Firm—Cantor Colburn LLP

(57) ABSTRACT

A method for acquiring order information data from a server controlling the order information for medical imaging system, and controlling the order information, comprises the steps of; storing order information data acquired from the server, in a memory device; detecting a change of the order information data in the server; and acquiring the changed order information data from the server to store in the memory device when the change of the order information data in the server is detected.

14 Claims, 4 Drawing Sheets

FIG. 4 (a)

| NAME | ID | SEX | AGE | OBJECT | REGION |
|---|---|---|---|---|---|
| AKAI | AA | M | 32 | X-RAY | FOOT |
| AOTA | BB | M | 41 | X-RAY | BREAST |
| MOMOI | CC | W | 25 | CT | HEAD |
| KUROE | DD | M | 16 | X-RAY | HAND |

| NAME | ID | SEX | AGE | OBJECT | REGION |
|---|---|---|---|---|---|
| KUROE | DD | M | 16 | X-RAY | HAND |
| AKAI | AA | M | 32 | X-RAY | FOOT |
| AOTA | BB | M | 41 | X-RAY | BREAST |

| NAME | ID | SEX | AGE | OBJECT | REGION |
|---|---|---|---|---|---|
| SHIRAI | HH | W | 35 | X-RAY | BREAST |
| AKAI | AA | M | 32 | X-RAY | FOOT |
| AOTA | BB | M | 41 | X-RAY | BREAST |
| MOMOI | CC | W | 25 | CT | HEAD |

⋮

ORDER INFORMATION ACQUIRING METHOD AND ORDER INFORMATION CONTROLLING METHOD FOR MEDICAL IMAGING SYSTEM

BACKGROUND OF THE INVENTION

The present invention relates to a order information controlling method, and in particular, to a order information acquiring method and a order information controlling method which are preferably used in a medical field.

In a hospital which is relatively large in size, there are installed a hospital information system (HIS) and a radiology information system (RIS) so that information about patients may be controlled intensively. When these systems are used, order information in a hospital can be controlled.

In the case of a patient who needs radiographing, for example, when order information including a name, a sex, an age and a region for radiographing of the patient is inputted from a terminal in the hospital, the order information of this kind is stored temporarily in the server and then is transmitted to the radiographing apparatus. Therefore, it is possible for a operator such as a technologist to learn which patient should be radiographed by checking a display equipped on the radiographing apparatus, and thereby to conduct radiographing effectively.

Incidentally, when conducting radiographing actually, there are some occasions where an order of radiographing is changed independently of the order of order information, because a patient is not ready for radiographing or a region to be radiographed is different, or, for example, information accompanying the patient such as a caution for the patient is sometimes changed. However, if the order and contents in the order information of the server are changed in accordance with changes of the order of radiographing and information, the original data are also changed, and confusion may be caused. On the other hand, order information inputted in the server may also be erased or changed later, which needs to be reflected for radiographing.

The invention has been achieved in view of the problem in the conventional technology stated above, and its first object is to provide a medical order information controlling method which can control order information without causing any confusion.

Further, order information stored in the server is predicted to be in a large amount, and it also includes information having no connection with radiographing. Therefore, there is also predicted an occasion wherein only downloading and simply displaying of order information stored in the server makes it difficult to find out target information.

The invention has been achieved in view also of the problem in the conventional technology stated above, and its second object is to provide a medical order information acquiring method which can specify target medical order information effectively.

SUMMARY OF THE INVENTION

Means to achieve the first and second objects stated above are as follows.

(1) A medical order information controlling method of the invention is one that acquires medical order information from the server that controls medical order information and controls it, wherein medical order information is acquired from the server, and is stored in the first and second memory devices, and then at prescribed intervals, medical order information of the aforesaid server and medical order information stored in the first memory device are compared, and when both of them are different each other, medical order information is acquired from the server to be stored in the first memory device, and the medical order information stored in the second memory device are updated at prescribed timing based on the medical order information stored in the first memory device, thus, it is possible to change optionally medical order information stored in the second memory device equipped on the radiographing apparatus, for example, without changing the medical order information in the server. Even when order information is changed on the server side, it is possible to conduct processing based on the latest data, by considering medical order information stored in the second memory device.

(2) It is further preferable that the first and second memory devices are equipped on a radiographing apparatus, and medical order information stored in the second memory device can be changed by operations on the radiographing apparatus side. Further, an ultrasound diagnosis apparatus will also do in place of the radiographing apparatus.

(3) Further, if the first memory device stores raw data concerning the medical order information acquired from the server, medical order information stored in the server can easily be compared with medical order information stored in the first memory device, which is preferable.

(4) Further, if the first memory device converts medical order information acquired from the server into data of a prescribed format to store the data after conversion, medical order information stored in the server can be compared effectively with medical order information stored in the first memory device, only by taking out data necessary for comparison.

(5) Further, if the first memory device stores checksums concerning medical order information acquired from the server, and compares the medical order information by means of comparison of checksums, it is possible to compare medical order information stored in the server with medical order information stored in the first memory device more effectively. It is further possible to keep the storage capacity of the first memory device to be low.

(6) With regard to the prescribed timing, if it is other than the moment when processing is conducted based on medical order information stored in the second memory device, and other than the moment when processing can be conducted, updating of medical order information does not interfere the radiographing as processing, for example, which is preferable.

(7) Further, with regard to the prescribed timing, if it is immediately after processing conducted based on the medical order information stored in the second memory device, updating of medical order information does not interfere the radiographing as processing, for example, which is preferable.

(8) Further, in the course of updating medical order information stored in the second memory device based on medical order information stored in the first memory device, when processing based on medical order information stored in the second memory device is prohibited, this prohibition of processing tells that the medical order information has been updated, which is preferable.

(9) Further, if information concerning the prohibition of processing is displayed while the processing is prohibited, this display indicates that the medical order information has been updated, which is preferable.

(10) A medical order information acquiring method of the invention is one for acquiring order information and for inputting it in a medical imaging system, and it includes at least two of the first acquiring method to access the server at the prescribed timing and to acquire the medical order information corresponding to the medical imaging system, the second acquiring method to acquire medical order information from the server based on information about a patient, and the third acquiring method to acquire medical order information by inputting directly into the medical imaging system.

Herein, the order information acquired by the first acquiring method includes all the order information for the medical imaging systems and usually become a large amount of information, while the information acquired by the second or the third acquiring method is limited to the information for the patients who are going to be subjected to the medical imaging system. Therefore, in many cases, the information acquired by the second or the third method is in higher priority than the information acquired by the first method.

Therefore, even when the medical order information acquired by the first acquiring method is extremely large in amount, for example, medical order information can be obtained by using the second or the third acquiring method, and target information can be specified efficiently by comparing the acquired medical order information. Incidentally, various apparatuses such as a radiographing apparatus and an ultrasound imaging apparatus are considered as the medical imaging system.

(11) Further, when the medical order information stored in the server is changed, if the changed medical order information is inputted in the medical imaging system, the latest information is reflected, which is preferable.

(12) Further, when the medical order information is acquired by using the first acquiring method and the second acquiring method, if the medical order information acquired by using the second acquiring method is displayed to be upper than any other medical order information on the list, target information can be specified efficiently, which is preferable.

(13) Further, when the medical order information is acquired by using the first acquiring method and the second acquiring method, if the indication color of the medical order information acquired by using the second acquiring method is changed to be different from those of any other medical order information, target medical order information can be specified efficiently, which is preferable.

(14) Further, when the medical order information is acquired by using the first acquiring method and the third acquiring method, if the medical order information acquired by using the third acquiring method is displayed to be upper than any other medical order information on the list, target information can be specified efficiently, which is preferable.

(15) Further, when the medical order information is acquired by using the first acquiring method and the third acquiring method, if the indication color of the medical order information acquired by using the third acquiring method is changed to be different from those of any other medical order information, target medical order information can be specified efficiently, which is preferable.

(16) Further, when the medical order information is acquired by using the second acquiring method or the third acquiring method, if the newer information inputted is displayed at the higher position on the list, target medical order information can be specified efficiently, which is preferable.

Each of FIGS. 4(*a*), 4(*b*) and 4(*c*) is a diagram showing an example of display of order information.

Figure 5:
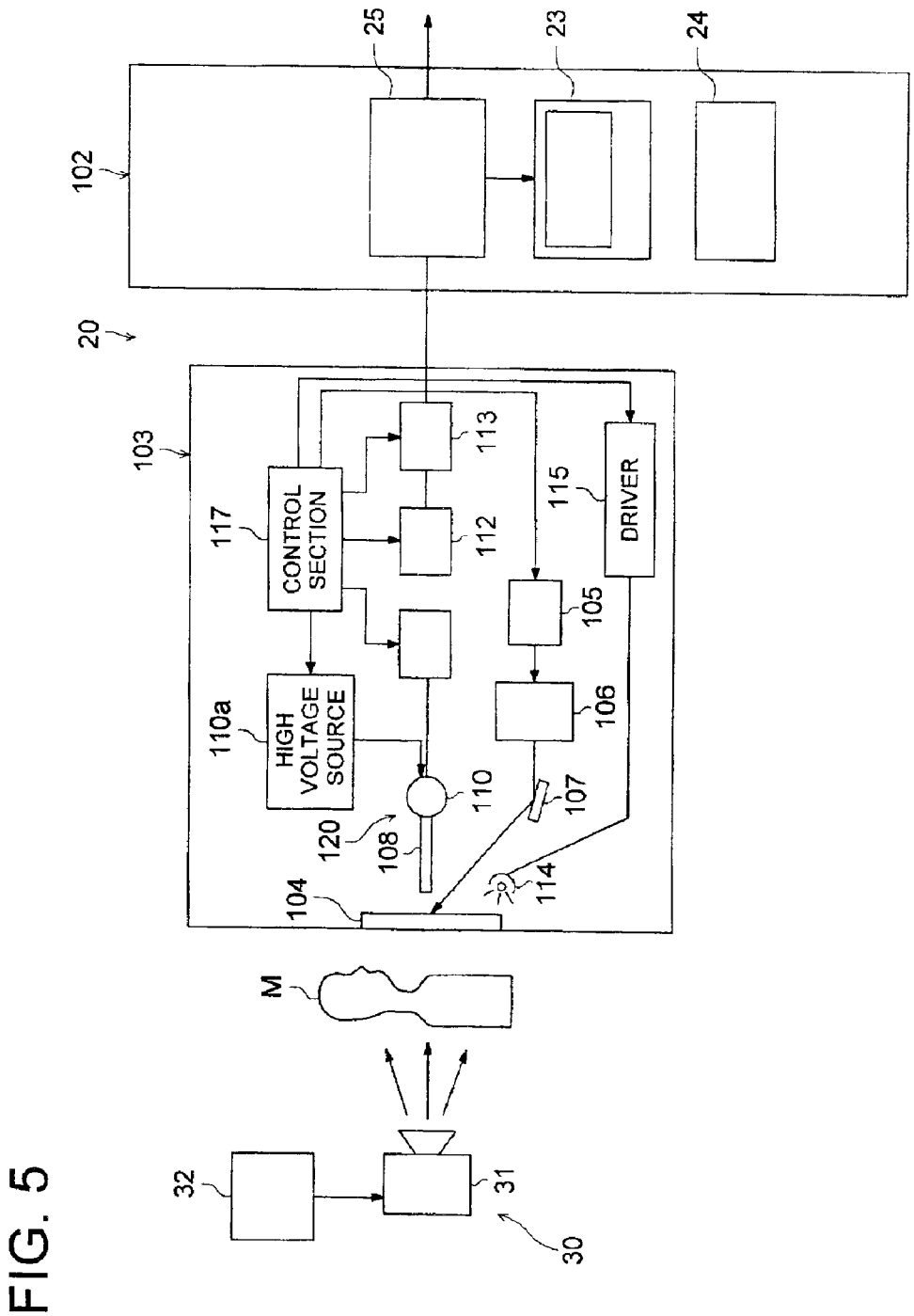

FIG. 5 is a diagram showing a schematic structure of a radiographing apparatus which can be applied to the present embodiment.

DETAILED DESCRIPTION OF THE PREFERRED EMBODIMENT

Figure 1:
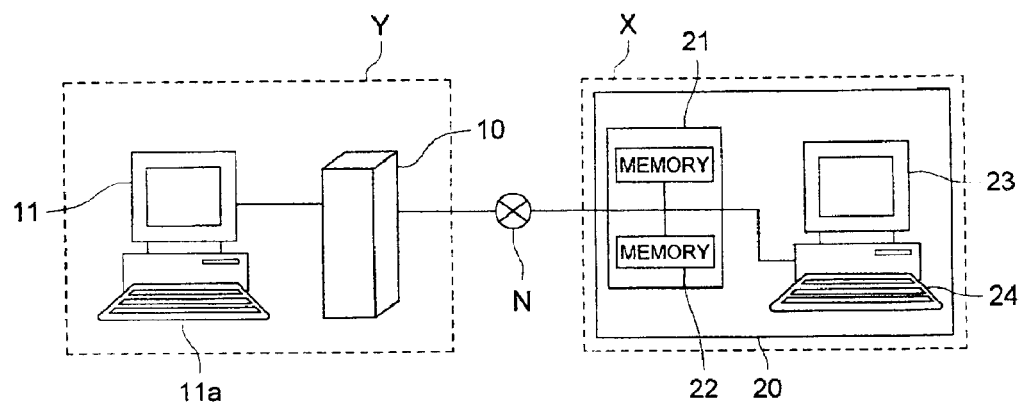
FIG. 1 is a schematic structure diagram of the network system that carries out a medical order information controlling method representing the present embodiment.

An embodiment of the invention will be explained in detail as follows. FIG. 1 is a schematic structure diagram of the network system that carries out a medical order information controlling method representing the present embodiment.

In FIG. 1, server 10 installed in an office of a hospital is one constituting a part of a hospital information system (HIS) and a radiology information system (RIS), and it can input order information through key board 11*a* of terminal 11 connected.

The server 10 is connected to radiographing apparatus 20 in radiographing room X through the network N. The radiographing apparatus 20 has therein memory 21 representing a first memory device, memory 22 representing a second memory device, display 23 and operation panel 24, in addition to radiographing section 103 (FIG. 5).

When radiographing, a doctor operates terminal 11 for itself, an operator operates terminal 11 based on the instruction of the doctor, or a receptionist operates terminal 11, and thereby, order information is accumulated in server 10. The order information in this case is one composed, for example, of a name, a sex and an age of a patient and of regions to be radiographed.

For example, radiographing apparatus 20 accesses server 10 when the power is turned on, and order information which has been read from the server 10 is stored in memory 21 and also in memory 22.

Figure 2:
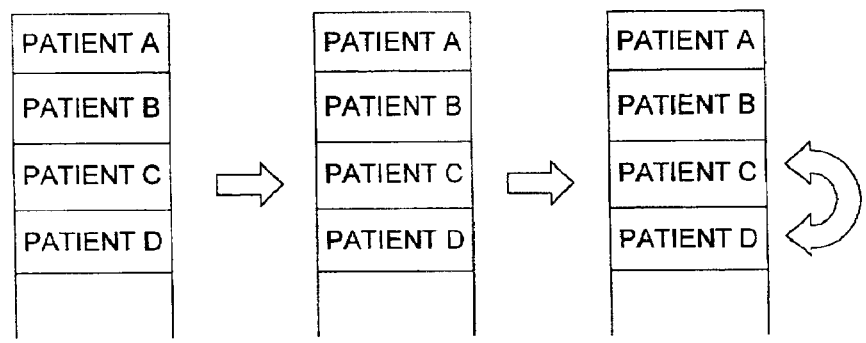
FIG. 2 is a diagram showing an order of order information.

FIG. 2 is a diagram showing an order of order information. Order information stored in memories 21 and 22 can be confirmed by display 23 (FIG. 1). Primarily, radiographing is conducted in the displayed order. However, it sometimes happens that a radiographer has to move up patient D for radiographing to save the waiting time because patient C who is scheduled to be radiographed before the patient D is not in a radiographing room when the radiographer tries to radiograph the patient C in the radiographing room. In this case, the radiographer can operate through operation panel 24 to change the order of patients C and D.

The order of patients C and D in the order information stored in memory 22 is changed by the operation mentioned above, and order information after the change is stored. However, order information stored in memory 21 is not changed. Therefore, as far as the information stored in server 10 is not changed, both of them agree with each other.

Therefore, even after the checking of the order information in the server, the display in operation panel 24 does not return to the previous radiographing order that is registered in the server. Further even in the case where an error of a patient name is corrected through operation panel 20, the content of the correction is effective only in the radiographing apparatus 20. If this correction is reflected to the center server, confusion in handling the order information arises, due to the fact that a person who is authorized only to the operation of radiographing apparatus is able to handle the original of the information in the hospital. Therefore, the above system in which the correction is not reflected to the server is preferable.

In this case, order information in the server 10 is optionally updated when a patient who needs radiographing newly appears. Since the radiographing apparatus 20 accesses server 10 at regular intervals of a certain period of time (for example, of 10 minutes) and compares order information, it is possible to learn whether the order information of server 10 has been changed or not.

The comparison like this is conducted in the following methods.

(Method 1)

In this method, raw data relating to reservation data are stored in memory 21 from server 10, and raw data are compared with other raw data in the case of an access of the radiographing apparatus 20. This method is a most sure method.

(Method 2)

In this method, order information is read out of server 10 to be converted into a prescribed format, and data after conversion are stored in memory 21, thus, in the case of an access of the radiographing apparatus 20, necessary data only (for example, a patient name and regions) are compared with other necessary data. Compared with an occasion wherein raw data are compared with other raw data, comparison can be carried out more efficiently. It is further possible to keep a storage capacity of memory 21 to be low.

(Method 3)

In this method, checksums concerning order information read out of server 10 are obtained, and these checksums are stored in memory 21 so that checksums are compared with other checksums when the radiographing apparatus 20 accesses. Compared with the aforesaid methods, comparison can be carried out most efficiently. It is further possible to keep a storage capacity of memory 21 to be low.

When the order information in server 10 is judged by the comparison like this to have been changed, the radiographing apparatus 20 updates order information stored in memory 21 in a form of converting into order information read out of server 10.

Then, the radiographing apparatus 20 updates order information stored in memory 22. However, if the order information is updated carelessly, there is a fear for a radiographer to be confused because the radiographer is radiographing based on order information stored in memory 22, and there also is a fear that unintended radiographing is carried out accidentally. It is therefore possible to commit that it is preferable to update order information in memory 22 at the timing that controls confusion of a radiographer.

It is preferable that the timing to control confusion of a radiographer is outside a period of time when radiographing processing is actually conducted based on the order information stored in memory 22, and is outside the moment when radiographing processing is ready (for example, when a patient to be radiographed is set on a radiographing stand to be ready for radiographing). Furthermore, it is more preferable that the timing to control confusion of a radiographer is immediately after radiographing (for example, immediately after a radiographer presses an unillustrated radiographing button), because radiographing is less influenced even when the order information is updated.

In addition, for controlling confusion of radiographing, it is considered to prohibit radiographing processing (for example, radiographing is not carried out even when a radiographing button is pressed), when updating order information, by making display 23 to indicate the message of "no radiographing is allowed because of updating of order information". A radiographer who has observed this message can learn that order information is being updated, and can wait until the order information is rewritten to the new one.

Figure 3:
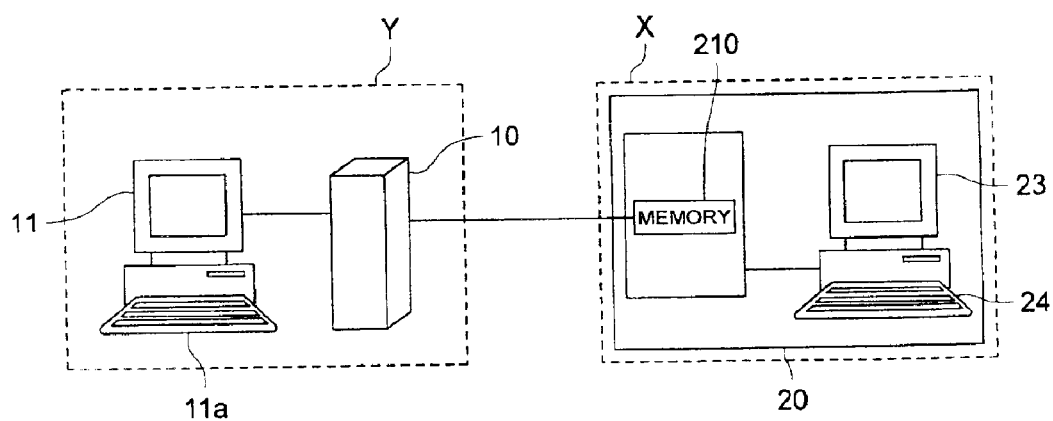
FIG. 3 is a schematic structure diagram of the network system that carries out a medical order information controlling method representing the present embodiment.

FIG. 3 is a schematic structure diagram of the network system that implements a medical order information acquiring method representing the other embodiment.

In FIG. 3, server 10 installed in office Y of a hospital is one constituting a part of a hospital information system (HIS) and a radiology information system (RIS), and order information can be inputted therein through key board 11a of terminal 11 connected.

The server 10 is connected to the radiographing apparatus 20 installed in radiographing room X through the network N. The radiographing apparatus 20 has therein memory 210 representing a memory device, display 22 and operation panel 23, in addition to radiographing section 103 (FIG. 5).

When radiographing, a doctor operates terminal 11 for itself, or an operator operates terminal 11 based on the instruction of the doctor, and thereby, order information is accumulated in server 10. The order information in this case is one composed, for example, of a name, a sex and an age of a patient and of regions to be radiographed.

For example, radiographing apparatus 20 accesses server 10 at regular intervals of 10 minutes (time can be changed optionally), and order information read out of it is stored in memory 210. The order information stored in memory 210 can be displayed on display 22.

Each of FIGS. 4(a)–4(c) is a diagram showing an example of order information displayed on display 22. In this case, a radiographer can check a name of the patient who has come to the radiographing room, while observing the display, and can conduct necessary radiographing.

However, an amount of information stored in server 10 is tremendous, and information which is unnecessary for radiographing (for example, order information requesting ultrasound diagnosis) is also included. Therefore, if all pieces of information are downloaded from the server 10, it is sometimes difficult to search the target information.

In concrete explanation of the foregoing, order information displayed as in FIG. 4(a) is exactly the same as information stored in server 10 which has been downloaded, and it therefore includes information for CT or the like other than radiographing. Under this situation, it is impossible to search specific information because an amount of information is too much.

In the present embodiment, on the other hand, it is possible to use the following three acquiring methods by combining them.

1) A method to acquire order information by focusing an object to radiographing (by focusing medical imaging system to a radiographing apparatus) by means of inputting from operation panel 23.
2) A method to acquire order information by focusing patients by means of inputting from operation panel 23.
3) A method to acquire order information based on information inputted from operation panel 23.

Incidentally, the server 10 provides order information focused by some of the methods stated above to radiographing apparatus 20. The information thus provided is stored in memory 210 of the radiographing apparatus 20.

In the example shown in FIG. 4(b), an object is focused to radiographing first (method 1)) and then patients are focused to those of 20 years old and downward (method 2)) for acquiring order information.

For example, when a patient arrives at a radiographing room, it is impossible to search target reservation easily when the number of cases displayed is large, if the method 1) only is used.

In that case, if an age of the patient is known, reacquiring is conducted under the condition of 20 years old and downward, for example. In this case, information acquired by the method 2) is given priority, and when this information is displayed to be in an upper position in a reservation list on display 22, the information can easily be searched from many lists. In this case, it is possible to exhibit an emphasizing effect by changing a color of characters for only information having priority or by reversing the display for the information.

Further, there sometimes is an occasion wherein reservation which is not included in the reservation acquired by the method 1) only is acquired by the method 2). This is a case wherein a reservation of Mr. X scheduled to be radiographed by apparatus B is acquired by apparatus A through the method 2) because of troubles of the apparatus B, under the condition that only reservations scheduled to be radiographed by apparatus A have been acquired by the method 1), when a plurality of radiographing apparatuses such as, for example, apparatus A and apparatus B are operated. In this case, it is preferable to display the reservation of Mr. X by giving priority thereto because it has high attention.

As patient information for focusing order information which can be inputted from operation panel 23, there are considered various ones such as a name, an ID number, a sex and an age (—years and upward, —years and downward) and regions to be radiographed of a patient. Incidentally, when the scheduled time for radiographing is included in each order information, it is also considered that pieces of order information are arranged to be in a sequence wherein a piece of information closest to the present time comes first.

Though the method 1) and the method 2) are combined in the example stated above, the method 1) and the method 3) can also be combined.

In this case, a name of a patient "SHIRAI (other than four persons in the diagram)" and a region to be radiographed are not acquired from a server, but order information is acquired when an operator inputs these information directly from operation panel 23 or from an unillustrated inputting terminal, and it is possible to display a list in which the information of the method 3) shown in FIG. 4(C) is given priority. This is preferable when radiographing an emergency patient who is not registered in a server.

FIG. 5 is a diagram showing a schematic structure of a radiographing apparatus which can be applied to the present embodiment. As shown in FIG. 5, radiographing apparatus 20 is equipped with radiographing section 103 and controller 102.

Radiographing section 103 is one wherein information of radiographic image (X-ray transmission plane image) of a subject such as a human body created by X-ray emitted from X-ray generator 30 is accumulated and recorded temporarily on plate-shaped stimulable phosphor plate 4 that is structured by laminating accumulative phosphor on a support by utilizing stimulable phosphor that stores a part of X-ray energy when irradiated by X-ray from X-ray source 31 driven by driving source 32 and shows photo-stimulated luminescence in accordance with X-ray energy accumulated when irradiated by exciting light such as visible light or a laser beam, and the stimulable phosphor plate 4 is scanned by a laser beam so that photo-stimulated luminescence may be conducted successively, and light of photo-stimulated luminescence is read in succession photoelectrically by photoelectric reading section 120 to obtain image signals.

Then, the radiographing section 103 radiates erasing light on the stimulable phosphor plate 104 after being subjected to image signal reading, so that X-ray energy remaining on the plate may be released for the following radiographing.

The radiographing section 103 has therein stimulable phosphor plate 104 on which radiographic image information of subject M representing a subject is recorded, laser light source section 106 composed of a laser diode or the like generating a laser beam representing exciting light for the stimulable phosphor plate 104, laser driving circuit 105 for driving the laser light source section 106, optical system 107 for scanning the stimulable phosphor plate 104 with a laser beam emitted from the laser light source section 106, and photoelectric reading section 120 that converges photo-stimulated luminescence excited by an exciting laser beam, then, conducts photoelectric conversion and obtains image signals. The photoelectric reading section 120 has therein light-converging body 108 that converges photo-stimulated luminescence excited by an exciting laser beam, photomultiplier 110 that converts light converged by the light-converging body 108 photoelectrically, high voltage source 110*a* that impresses voltage on the photomultiplier 110, conversion section 111 that converts current signals coming from the photomultiplier 110 into digital signals through current-voltage conversion, voltage amplification and A/D conversion, correction section 112 that corrects digital signals converted by the conversion section 111, and image transmission section 113 that transmits digital signals corrected by the correction section 112, and digital signals of the read radiographic image are transmitted to controller 102. Incidentally, the correction section 112 is composed of RISC processor and it corrects delay in response and non-uniformity of digital signals.

The radiographing section 103 further has halogen lamp 114 that radiates erasing light and driver 115 that drives the halogen lamp 114, for releasing X-ray energy remaining on stimulable phosphor plate 104 after being subjected to image signal reading. The radiographing section 103 further has control section 117 that controls respectively laser driving circuit 105, high voltage source 110*a*, conversion section 111, correction section 112, image transmitting section 113 and driver 115. Laser light source section 106, optical system 107, light-converging body 108, photomultiplier 110 and halogen lamp 114 all of the radiographing section 103 are moved solidly as an unillustrated sub-scanning unit in the sub-scanning direction perpendicular to the laser scanning direction by an unillustrated ball screw mechanism. This sub-scanning unit conducts sub-scanning by moving in the course of image reading, and halogen lamp 114 emits light for erasing in the course of its returning.

The controller 102 has therein personal computer main body section 25, key board (or operation panel) 24 and monitor display section (display) 23, and it temporarily stores on a memory the digital signals of radiographic image information received from the radiographing section 103, then, conducts image processing and controls display on monitor display section 27 and image processing in accordance with operation input from key board 24, to output radiographic image information which has been subjected to image processing.

The invention has been explained above referring to the embodiments, and yet the invention should not be construed to be limited to the embodiments, and modifications and improvement may naturally be made.

For example, as a medical imaging system, there are available a computed tomography (CT), a magnetic resonance imaging (MRI), an ultrasound imaging apparatus and a digital X-ray apparatus, in addition to the radiographing apparatus. The invention is further applicable to acquisition and control of order information for medical imaging system other than the apparatuses mentioned above.

What is claimed is:

1. A method of acquiring and controlling an order information data for a medical apparatus, which has a first memory device and a second memory device for storing the order information data, from a server controlling medical order information, and of controlling the order information, the method comprising:

acquiring the order information data from the server;

storing the order information data acquired from the server, into both of the first memory device and the second memory device;

keeping the order information data stored in the first memory device unchangeable, while the order information data stored in the second memory device is modifiable in the course of processing the medical apparatus;

acquiring the order information data from the server again in predetermined time interval;

detecting a change between newly acquired order information data and previously stored order information data in the first memory device;

updating the order information data in the first memory device with the newly acquired order information data when the change is detected; and updating the order information data in the second memory device based on the order information data newly stored in the first memory device at a prescribed timing when the medical apparatus is not in the course of processing.

2. The method of claim 1, wherein the first memory device stores raw data concerning the medical order information data acquired from the server.

3. The method of claim 1, wherein the first memory device converts the order information data acquired from the server into data of a prescribed format, and stores the data after conversion.

4. The method of claim 1, wherein the first memory device stores a checksum concerning order information data acquired from the server, and the step of detecting a change is conducted by means of comparison of the checksum.

5. The method of claim 1, the prescribed timing is immediately after a processing of the medical apparatus is conducted based on the order information data stored in the second memory device.

6. The method of claim 1, wherein in the course of updating the order information data in the second memory device based on the order information data newly stored in the first memory device, processing of the medical apparatus based on the order information data stored in the second memory device is prohibited.

7. The method of claim 6, wherein while processing of the medical apparatus is prohibited, information concerning the prohibition is displayed.

8. The method of claim 1, further comprising two of the following three steps of acquiring the order information data:

(step 1) accessing the server at the prescribed timing to acquire the order information data for the medical imaging system, (step 2) acquiring order information data from the server based on information about a patient, and (step 3) acquiring order information data inputted directly into the medical imaging system.

9. The method of claim 8, wherein when the order information data is acquired by using the step 1 and the step 2, the medical order information data acquired by using the step 2 is displayed at a higher position in the order list than the other order information data.

10. The method of claim 8, wherein when the order information data is acquired by using the step 1 and the step 2, the indication color of the order information data acquired by using the step 2 is changed to be different from the indication color of any other medical order information data in the order list.

11. The method of claim 8, wherein when the order information data is acquired by using the step 1 and the step 3, the medical order information data acquired by using the step 3 is displayed at a higher position in the order list than the other order information data.

12. The method of claim 8, wherein when the order information data is acquired by using the step 1 and the step 3, the indication color of the order information data acquired by using the step 3 is changed to be different from the indication color or any other medical order information data.

13. The method of claim 8, wherein when the order information data is acquired by using the step 2 and the step 3, the newer inputted information is displayed at the higher position.

14. A medical system having an acquiring and controlling function of order information data for a medical apparatus, which has a first memory device and a second memory device for storing the order information data from a server controlling medical order information, the medical system comprising:

an order information data acquiring section for acquiring the order information data from the server in predetermined time interval;

a storage section for storing the order information data acquired from the server, into both of the first memory device and the second memory device, wherein the order information data stored in the first memory device is kept unchangeable until being updated later, while the order information data stored in the second memory device is modifiable in the course of processing the medical apparatus; and a detecting section for detecting a change between newly acquired order information data and previously stored order information data in the first memory device, wherein the order information data in the first memory device is updated with the newly acquired order information data when the change is detected, wherein the order information data in the second memory device is updated based on the order information data newly stored in the first memory device at a prescribed timing when the medical apparatus is not in the course of processing.

* * * * *